United States Patent
Louviot et al.

(10) Patent No.: US 10,392,126 B2
(45) Date of Patent: Aug. 27, 2019

(54) METHOD AND APPARATUS FOR CONTROLLING VEHICLE ATTITUDE DISPLAY

(71) Applicant: ECOLE NATIONALE DE L'AVIATION CIVILE, Toulouse (FR)

(72) Inventors: Denis Louviot, Colomiers (FR); Stéphane Conversy, Toulouse (FR); Hélène Gaspard-Boulinc, Toulouse (FR)

(73) Assignee: ECOLE NATIONALE DE L'AVIATION CIVILE, Toulouse (FR)

( * ) Notice: Subject to any disclaimer, the term of this patent is extended or adjusted under 35 U.S.C. 154(b) by 0 days.

(21) Appl. No.: 15/849,818

(22) Filed: Dec. 21, 2017

(65) Prior Publication Data

US 2018/0178926 A1    Jun. 28, 2018

(30) Foreign Application Priority Data

Dec. 22, 2016   (EP) .................................... 16306781

(51) Int. Cl.
*B64D 45/00*   (2006.01)
*G01C 23/00*   (2006.01)

(52) U.S. Cl.
CPC ........... *B64D 45/00* (2013.01); *G01C 23/005* (2013.01)

(58) Field of Classification Search
None
See application file for complete search history.

(56) References Cited

U.S. PATENT DOCUMENTS

| 7,403,133 B2 * | 7/2008 | He | G01C 23/00 340/974 |
| 7,626,515 B1 * | 12/2009 | Langner | G01C 23/00 340/971 |
| 2003/0137433 A1 | 7/2003 | Schiller | |
| 2006/0212182 A1 | 9/2006 | Shaw | |
| 2013/0304283 A1 * | 11/2013 | Puyou | G05D 1/0808 701/14 |
| 2015/0116345 A1 | 4/2015 | Shoup | |

FOREIGN PATENT DOCUMENTS

EP    2589538 A1   5/2013

OTHER PUBLICATIONS

European Search Report for 16306781.2 dated Aug. 23, 2017.

* cited by examiner

*Primary Examiner* — Thomas S McCormack
(74) *Attorney, Agent, or Firm* — Meagher Emanuel Laks Goldberg & Liao, LLP

(57) ABSTRACT

A vehicle attitude display such as a Primary Flight Display presents pitch and bank information by displaying a vehicle avatar as fixed, with respect to a moving artificial horizon while displaying a movable symbol at a position along the vehicle avatar that is proportional to the symmetry of the vehicle. Parts of the display are dynamically emphasized or de-emphasized to support rapid assimilation of key data. Display format may be dynamically adjusted depending on vehicle use conditions. Display is intended for use both in-vehicle, and remotely.

10 Claims, 8 Drawing Sheets

Display

METHOD AND APPARATUS FOR CONTROLLING VEHICLE ATTITUDE DISPLAY

FIELD OF THE INVENTION

Aircraft cockpits are generally equipped with flight instruments intended to facilitate the work of the pilot. One common instrument is the attitude indicator, also known as gyro horizon, artificial horizon or attitude director indicator, which provides the pilot with information concerning the attitude of the aircraft in space, in terms of pitch, that is, the degree to which the nose of the aircraft is pointing upwards or downwards, bank or tilt—the degree to which the aircraft is leaning to one side or another with respect to a central axis aligned from the front to the back of the aircraft fuselage.

FIG. 1 shows a first attitude indicator as known in the prior art.

More specifically, the attitude indicator 100 of FIG. 1 corresponds to the standard instrument used in aircraft developed in the USA, Europe and other countries commonly referred to as "western". As shown, the attitude indicator comprises an aircraft representation 110 representing the aeroplane in which the instrument is mounted, having an index 112 at the centre of the instrument region, and lateral lines 111, 113 representing the wings of the aircraft. The aircraft representation 110 is fixed with respect to the instrument as a whole. The instrument further comprises a horizon representation 120, which is orientated with respect to the aircraft representation such that the respective orientation of the horizon with respect to the aircraft representation corresponds to the orientation of the aircraft itself with respect to the ground, or more particularly with respect to a line perpendicular to a line between the aircraft and the centre of the earth. By thus adjusting the orientation of the horizon representation, the pilot is provided with an indication in terms of bank or tilt—the degree to which the aircraft is leaning to one side or another with respect to a central axis aligned from the front to the back of the aircraft. The horizon representation is furthermore associated with a graduated scale 130. This scale is fixed in position with respect to the horizon representation 120. The Horizon representation can be repositioned not only so as to represent bank angles as described above, by rotation about an axis passing through the index 112, but also so as to indicate pitch, that is, the degree to which the nose of the aircraft is pointing upwards or downwards, by movement of the horizon representation so as to lie above or below the index 112. The actual angle of bank can then be read from the graduated scale 140, in front of the pointer 141.

FIG. 2 shows a first attitude indicator as known in the prior art.

More specifically, the attitude indicator 200 of FIG. 2 corresponds to the standard instrument used in aircraft developed in Russia or historically in the USSR and "Eastern Bloc" countries. As shown, the attitude indicator comprises an aircraft representation 210, representing the aeroplane in which the instrument is mounted, having an index 212 at the centre of the instrument region, and lateral lines 211, 213 representing the wings of the aircraft. The aircraft representation 210 is axially moveable with respect to the instrument as a whole about an axis passing through the index 212. The instrument further comprises a horizon representation 220, which is susceptible of vertical movement with respect to the instrument itself and the aircraft representation, but unlike the arrangement described with respect to FIG. 1, cannot be reoriented axially. By thus adjusting the orientation of the aircraft representation 210 with respect to the horizon representation 220, the pilot is provided with an indication in terms of bank or tilt—the degree to which the aircraft is leaning to one side or another with respect to a central axis aligned from the front to the back of the aircraft. The horizon representation is furthermore associated with a graduated scale 230. This scale is fixed in position with respect to the horizon representation 220. The Horizon representation can be repositioned vertically, so as to indicate pitch, that is, the degree to which the nose of the aircraft is pointing upwards or downwards, by movement of the horizon representation so as to lie above or below the index 212. The actual angle of bank can then be read from the graduated scale 240.

It has been determined that the time taken to assimilate key information from the instrument described with respect to FIG. 1, with regard to the time it takes the pilot's gaze to travel through the various important regions of the instrument is unnecessarily long, and that it creates a significant occurrence of pilots' misinterpretations of bank side or variations (increased by the clutter of instrumental indications), which it is desirable to reduce. On the other hand, the instrument described in FIG. 2 is less likely to create this bank misinterpretation, but fails to show a representation corresponding to the outside view.

It is desirable to provide an interface supporting improved assimilation of information.

SUMMARY OF THE INVENTION

In accordance with the present invention in a first aspect there is provided a vehicle attitude display controller adapted to cause a display to present pitch and bank information of a vehicle associated with the display by representation of a vehicle avatar representing the vehicle with respect to an artificial horizon and graduated bank and pitch angle scale, characterized in that the display controller is adapted to cause the vehicle avatar to be displayed in fixed relation to the display and to display the artificial horizon at an angle with respect to the vehicle avatar corresponding to the real instantaneous bank angle of the vehicle and wherein the vehicle attitude display controller is further adapted to cause the display unit to display a movable symbol in a horizontal position with respect to the extremities of the vehicle avatar that is proportional to the symmetry of the vehicle.

In accordance with a development of the first aspect there may be provided a vehicle attitude display controller according to claim 1 wherein the vehicle attitude display controller is adapted to cause the display to represent the avatar as comprising lateral lines separated by an index point.

In accordance with a further development of the first aspect the vehicle attitude display controller may be adapted to cause the display to present pitch information with a movable linear scale aligned perpendicularly to the artificial horizon and passing through the vehicle avatar, such that an index point of the vehicle avatar designates an angle value on the scale reflecting the real instantaneous pitch attitude of the vehicle.

In accordance with a further development of the first aspect the vehicle attitude display controller may be adapted to cause the display to represent the symbol as a lozenge (maintains horizontal and perpendicular reference, improving clarity).

In accordance with a further development of the first aspect the vehicle attitude display controller may be adapted to cause the display to represent the movable symbol is moved parallel to the pitch rotation axis of the vehicle.

In accordance with a further development of the first aspect the display controller may be further adapted to cause the display unit to display a movable polar scale having its pole at the index point, whereby the bank attitude of the vehicle can be read from the polar scale with reference to a planar feature of the vehicle avatar.

In accordance with a further development of the first aspect the vehicle attitude display controller may be adapted to cause the display unit to display a planar feature representing the wingtip of the lower wing of the vehicle In accordance with a further development of the first aspect the vehicle attitude display controller may be adapted to cause the display unit to display the graduated scale outside the radius described by the planar feature as the vehicle changes bank.

In accordance with a further development of the first aspect the vehicle attitude display controller may be adapted to cause the display unit to display more relevant graduations of the pitch scale or of the bank scale in emphasized form with regard to less relevant respective graduations of the pitch scale or of the bank scale.

In accordance with a further development of the first aspect the vehicle orientation display controller may be adapted to cause the display unit to display graduations of the pitch scale below pitch values of +/−10 to 15° with respect to the instantaneous value in emphasized form with respect to other graduations on the pitch scale.

In accordance with a further development of the first aspect the vehicle orientation display controller may be adapted to cause the display unit to display graduations of the bank scale on the side the vehicle is banking towards in emphasized form with respect to the side the vehicle is banking away from.

In accordance with a further development of the first aspect the vehicle orientation display controller may comprise a mode selector adapted to cause the vehicle orientation display controller to output a display in accordance with any preceding claim in case where present conditions correspond to a first predetermined set of conditions, and to cause the vehicle orientation display controller to output an alternative display configuration in case where the present conditions correspond to a second predetermined set of conditions.

In accordance with the present invention in a second aspect there is provided a method of a displaying a plurality of vehicle characteristic features of a vehicle, the vehicle characteristic features including present pitch and bank information, the method comprising the steps of:
  reading input data for each feature determination,
  retrieving colour and emphasis conventions,
  performing feature value computation,
  performing display frame compilation, and
  storing display frame for display.

In accordance with a development of the second aspect the method may comprise additional steps implementing the functions of any development of the first aspect.

In accordance with the present invention in a third aspect there is provided a computer program adapted to implement the steps of the second aspect.

BRIEF DESCRIPTION OF THE DRAWINGS

The above and other advantages of the present invention will now be described with reference to the accompanying drawings, for illustration purposes only, in which.

DETAILED DESCRIPTION

Figure 1:
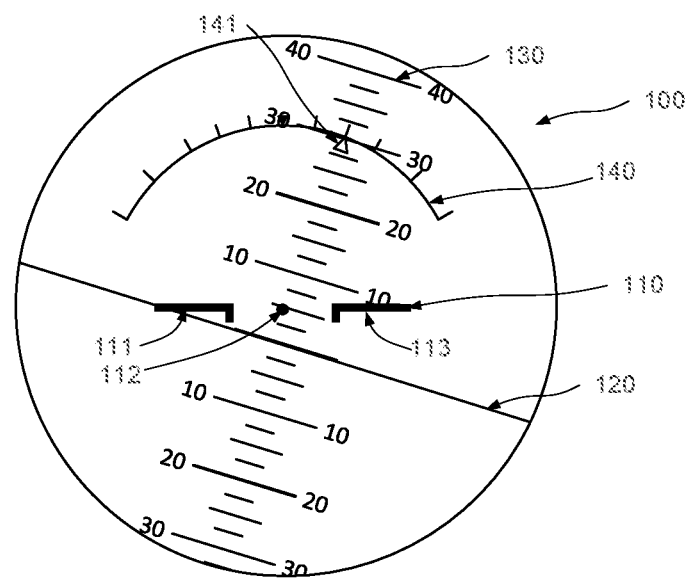
FIG. 1 shows a first attitude indicator as known in the prior art.
Figure 2:
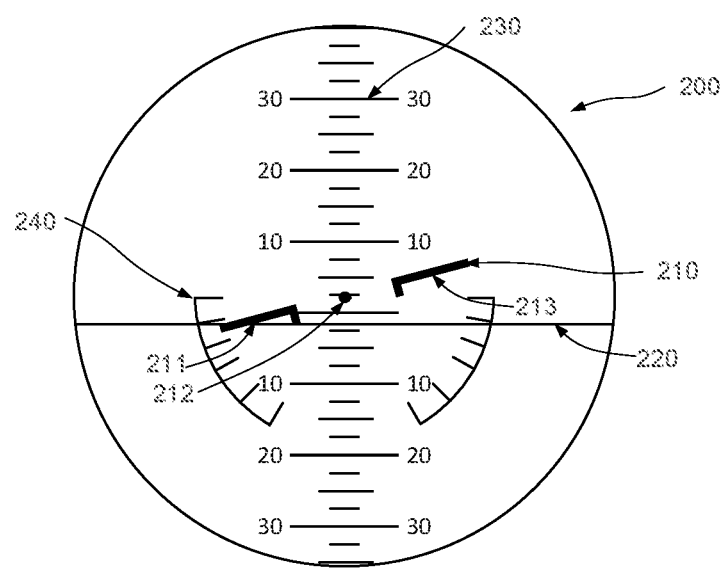
FIG. 2 shows a second attitude indicator as known in the prior art.

While the instrument layouts described with respect to FIGS. 1 and 2 have their origins in electro-mechanical instruments developed during the $20^{th}$ century, the availability of various graphic display technologies makes it possible to revisit the conventional instrument designs, with a view to increasing the speed with which key data can be assimilated, and increasing the immediacy of critical information, so as to improve pilot effectiveness and flight safety, whilst reducing pilot fatigue.

In the following description the term "instantaneous" is intended to refer to readings that are valid at the time of display, subject to some delay as imposed by the duration of sampling or averaging periods, the time required to process raw data for display, the reaction time of transducers, and the like. In some cases the maximum duration of the delay may be imposed by safety considerations, in which case the maximum tolerable delay will depend on the specific reading in question (for example, speed values may evolve less rapidly than attitude values, and therefore admit a greater delay) and implementation situation (an aeroplane's attitude will generally evolve more rapidly than a boat's and less delay may be tolerable). In some cases, and in particularly in the case of digital display, values may constitute average values as determined over a predetermined period prior to the moment of display. The duration of this period will once again be determined on the basis of various factors such as the minimum sampling period for the calculation of meaningful values on one hand, and the rapidity with which a user can assimilate rapidly changing readings on the other.

Figure 3:
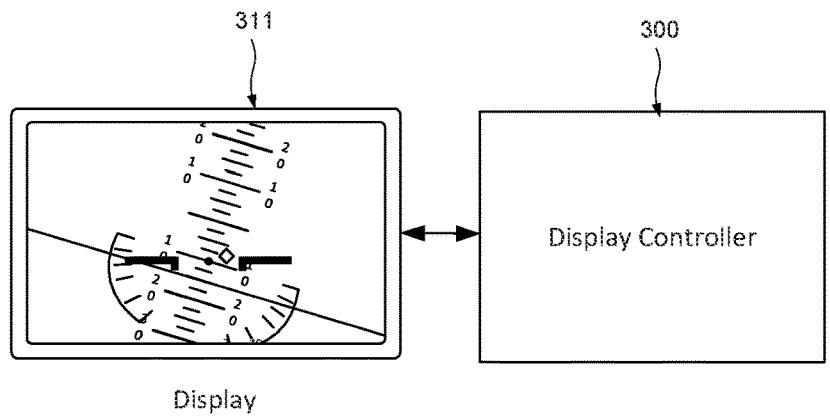
FIG. 3 shows a system in accordance with an embodiment.

FIG. 3 shows a system in accordance with an embodiment. As shown, there is provided a vehicle attitude display controller 300, in communication with a display 311.

In accordance with the embodiment, the vehicle attitude display controller 300 is adapted to cause the display 311 to present pitch and bank information of a vehicle associated with the display unit by representation of a vehicle avatar with respect to an artificial horizon and graduated bank and pitch angle scale.

While the technical background of the invention as described above is drawn from aircraft, and in particular fixed wing aircraft, it will be appreciated that applications are envisaged in the context of any vehicle in which orientation in space needs to be communicated to a pilot, and as such may include fixed wing aircraft, helicopters, boats, submarines, hovercraft, spacecraft, and so on.

Depending on the physical characteristics of the vehicle, the controller may be adapted to cause the display to represent the avatar as comprising an index lateral lines separated by an index point. In a case where the vehicle is a fixed wing aircraft, these lateral lines may represent the wings of the aircraft.

It may also be noted that although the display is associated with the vehicle, they need not be collocated. In certain embodiments, the display may be situated at a remote location, for example where the vehicle is a drone, UAV or remotely piloted vehicle, such that the display is provided at the location of the pilot. Still further, the vehicle may be a virtual or simulated vehicle.

Figure 4:
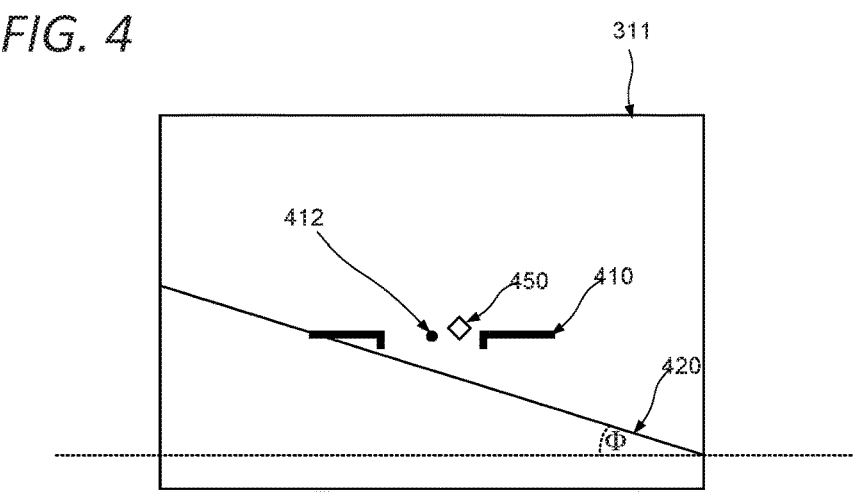
FIG. 4 shows further detail of the display in operation under the control of the display controller in accordance with an embodiment.

FIG. 4 shows further detail of the display in operation under the control of the display controller in accordance with an embodiment.

As shown in FIG. 4, the display 311 under control of the display controller 300 displays a vehicle avatar 410 in fixed relation to the display 311. The display 311 further displays an artificial horizon 420 at an angle Φ with respect to the vehicle avatar 410, where the angle Φ corresponds to the real instantaneous bank angle of the vehicle itself.

Furthermore, display unit 311 under control of the display controller 300 also displays a movable symbol 450 in a horizontal position with respect to the extremities of the vehicle avatar, the position of which is proportional to the symmetry of the vehicle, as determined for example by comparison with the relative air flow. The moveable symbol may take any form as appropriate to the context. It may for example take any geometrical form, for example a circle, ellipse, triangle, rectangle, square, lozenge, star, pentagon, hexagon or any arbitrary form as may be desired.

In some embodiments, the vehicle attitude display controller may be adapted to cause the display to represent the moveable symbol 450 as a lozenge or diamond with its points positioned at its vertical and horizontal extremities. This shape has been found in certain implementations to maintain horizontal and perpendicular frames of reference and thereby to improve clarity.

In some embodiments, the vehicle attitude display controller is adapted to cause the display to represent the movable symbol 450 as moving along the lateral lines of the avatar or along a line parallel to the pitch rotation axis of the vehicle, that is, horizontally with respect to the structure of the display.

In operation, the movable lozenge will normally (in symmetrical flight) be centred on the index point 412 of the vehicle avatar, and will be moved along the lateral lines of the vehicle avatar 410 to the right or the left (when the flight is side-slipping).

Figure 5:
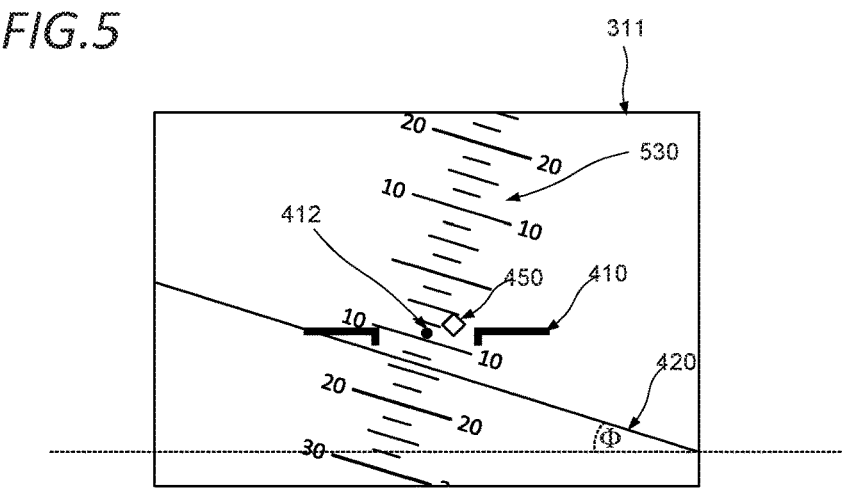
FIG. 5 shows further detail of the display in operation under the control of the display controller in accordance with an embodiment.

FIG. 5 shows further detail of the display 311 in operation under the control of the display controller 300 in accordance with an embodiment.

The features shown on the display of FIG. 5 under the control of the display controller include all those described with respect to FIG. 4, and additionally include a movable linear scale 530 aligned perpendicularly to the horizon and passing through the vehicle avatar 410, such that the index point of the vehicle avatar designates an angle value on the scale reflecting the real instantaneous pitch attitude of the vehicle.

Figure 6:
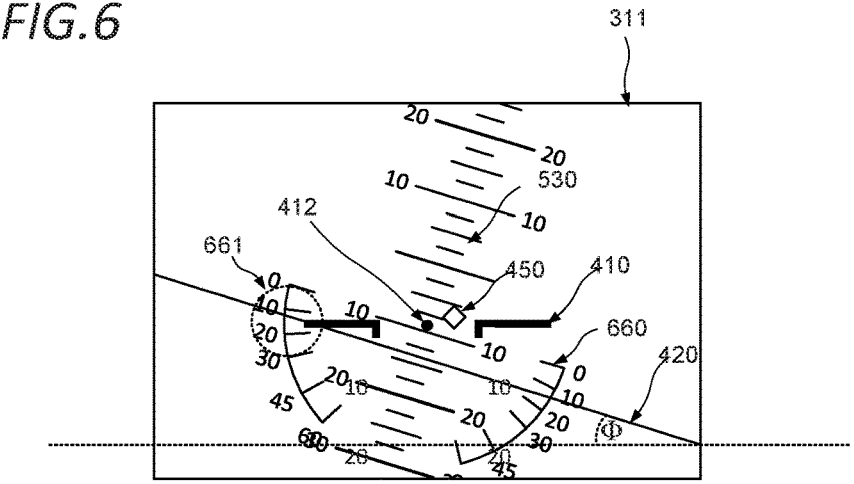
FIG. 6 shows further detail of the display in operation under the control of the display controller in accordance with an embodiment.

FIG. 6 shows further detail of the display in operation under the control of the display controller in accordance with an embodiment.

The features shown on the display of FIG. 6 under the control of the display controller include all those described with respect to FIGS. 4 and 5, and additionally include a movable polar scale 660 having its pole at the index point 412 situated midway along its main axis, whereby the bank attitude of the vehicle can be read from the polar scale with reference to a planar feature of the vehicle avatar.

As shown, the polar scale 660 is displayed as pivoting around the axis at the centre of the vehicle avatar 410 for example as provided by the index 412 as described above, with its neutral line (line joining the 0 of scale 660 to the 0 of scale 661) always parallel to the horizon line 420, despite this line is moved upwards or downwards.

In certain embodiments, the vehicle attitude display controller 300 may be adapted to cause the display 311 to display the polar scale 660 outside the radius described by the lateral extremities of the vehicle avatar, such as the wingtips in cases where the vehicle is a fixed wing aircraft, as the vehicle changes bank.

By this means, a user such as a pilot may read the instantaneous bank angle of the vehicle by reading the graduation of the polar scale 660 closest to lower of the two lateral extremities of the vehicle avatar 410, e.g. representing the wingtip of the lower wing of the vehicle.

For example, as shown in FIG. 6, it can be seen with reference to the region labelled 661 that the lower wingtip of the vehicle avatar 410 is between the graduations marked 10 and 20 on the polar scale 660, indicating a left bank of around 17 degrees.

Additionally, a FD (Flight Director) indication (not shown) may be superimposed to this attitude indicator, providing indication of the necessary bank angle or attitude angle to follow the planned path, as it is usual in already known displays, as for instance on an EADI (Electronic Attitude and Direction Indicator).

Figure 7:
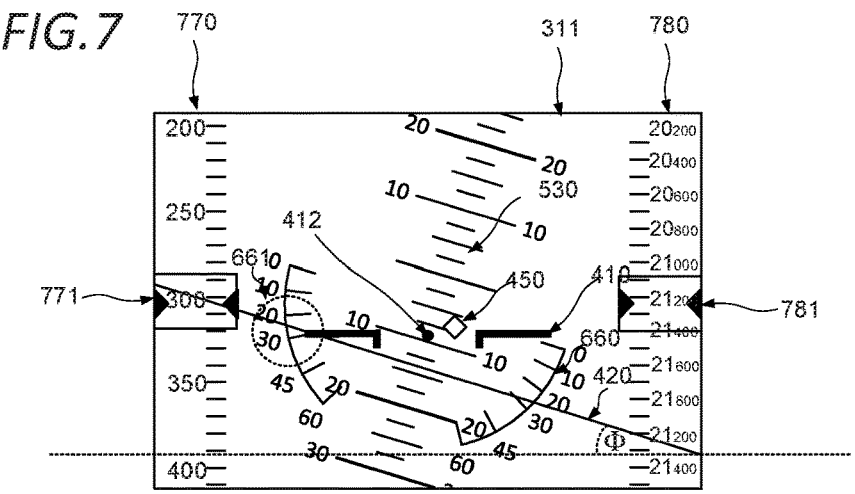
FIG. 7 shows further detail of the display in operation under the control of the display controller in accordance with an embodiment.

FIG. 7 shows further detail of the display in operation under the control of the display controller in accordance with an embodiment.

The features shown on the display of FIG. 7 under the control of the display controller 300 include all those described with respect to FIGS. 4, 5 and 6, and additionally includes a first moving graduated ribbon 770 representing airspeed values on the left hand side of the display whereby a series of values displayed on the ribbon are moved upward or downward in a fixed spatial relationship relative each other such that the value corresponding to the vehicle's instantaneous airspeed at any time is situated adjacent an airspeed index mark 771.

Optionally, as shown, the first graduated ribbon is displayed as fully or partially transparent, such that the horizon representation 420 and other features of the display are obscured to a minimum extent.

As such the vehicle orientation display controller may further be adapted to cause the display unit to display a transparent moving graduated ribbon representing airspeed values on the left hand side of the display and on the right with altitude values whereby a series of values displayed on the ribbon are moved upward or downward in a fixed spatial relationship relative each other such that the value corresponding to the vehicle's instantaneous airspeed at any time is situated adjacent an index mark.

The features shown on the display of FIG. 7 additionally include a second moving graduated ribbon 780 representing altitude values on the right hand side of the display whereby a series of values displayed on the ribbon are moved upward or downward in a fixed spatial relationship relative each other such that the value corresponding to the vehicle's instantaneous altitude at any time is situated adjacent an altitude index mark 781.

Optionally, as shown, the second graduated ribbon is displayed as fully or partially transparent, such that the horizon representation 420 and other features of the display are obscured to a minimum extent.

As such, the vehicle orientation display controller may further be adapted to cause the display unit to display a transparent moving graduated ribbon representing altitude values on the right hand side of the display whereby a series of values displayed on the ribbon are moved upward or downward in a fixed spatial relationship relative each other such that the value corresponding to the vehicle's instantaneous altitude at any time is situated adjacent an index mark.

Additionally, the vehicle orientation display controller may further be adapted to calculate trends in speed and altitude variation, and to cause the display unit to display a vertical trend bar incorporating an indication of vertical speed (not shown).

Additionally, the vehicle orientation display controller may be adapted to display a heading indicator. This may be displayed on the bottom part of the display, and may be selectively displayed in response to a user input. The graduations may be any convenient value, such as 10° steps around the compass rose, and add smaller steps (e.g. 1°) in response to a user input, for example when a target heading is to be set. Some navigation and orientation (ADF, VOR, ILS and other) indications may be superimposed to this heading indicator, as usual in known displays, as for instance on a HSI (Horizontal Situation Indicator).

Additionally, the vehicle orientation display controller may be adapted to display the flight envelope protection mode. For example, the vehicle orientation display controller may be adapted to display the flight envelope protection mode in the upper part of the display.

Additionally, the vehicle orientation display controller may be adapted display vehicle systems global status. For example the vehicle orientation display controller may be adapted to display vehicle systems global status, in the upper part of the display. This may take the form for example of a small secondary vehicle avatar, whose colour is set to a normal colour such as green in a case where all main vehicle systems are in normal condition, amber in a case where any main vehicle system is in a caution state, or red in a case where any main vehicle system is in a warning state for example when a warning alert is triggered and in red when a warning alert is triggered by an aircraft systems surveillance unit (not shown). The setting of the global status indicator to a caution or warning status may coincide with the presentation on a Multi-Function Display of the malfunctioning system page along with the relevant abnormal or emergency check-list.

Additionally, the vehicle orientation display controller may be adapted to display Automatic Pilot status. For example the vehicle orientation display controller may be adapted to display Automatic Pilot status, in the upper part of the display.

The flight envelope protection mode, systems status and Automatic Pilot Status information may presented in 3 separate boxes, on the top part of the display unit, clear of any attitude and heading information.

The vehicle orientation display controller may be adapted to display other indications such as Total Energy, Angle of Attack or Pilot Stress indications, computed by a combination of sensors, receivers and instruments, as detailed below.

All these above elements of display may be partially or totally integrated onto a HUD (Head-Up Display).

Additionally, the vehicle orientation display controller may be adapted to display pitch and bank angles by reference to a fixed horizon by a repositioned plane avatar, in order to provide them with an objective position of their aircraft, which may support better pilot performance at times when the pilot needs to frequently look in directions other than the fuselage axis. This representation may be particularly appropriate for pilots flying under HFD (Helmet Flight Display), UAV (Unmanned Vehicle Systems) pilots or remote pilots.

As such, there may be provided a mode selector adapted to determine which display layout is most suitable to the present conditions, and cause the vehicle orientation display controller to output a display as described with reference to any of the forgoing embodiments, such as those described with respect to FIGS. 3 to 8 in certain circumstances, and to cause the vehicle orientation display controller to output a prior art display configuration as described with reference for example to FIG. 1 or 2 to any of the forgoing embodiments in other predefined circumstances. More specifically, the mode selector may cause the vehicle orientation display controller to cause the vehicle orientation display controller to output a prior art display configuration when it is determined that the vehicle is moving within a predefined velocity range, when the vehicle is performing certain types of manoeuvre, when the vehicle's weapon systems are active, when the vehicle is subject to a radar lock, or when the pilot's head movements are determined to depart from alignment with the vehicle's axis of movement by more than a predetermined threshold. As such, the mode selector may receive inputs from vehicle systems and/or the pilot's helmet as discussed in further detail below in order to make the appropriate mode selection.

Accordingly, the vehicle orientation display controller may further be adapted to cause the display unit on request, (e.g. for pilots supposed to fly under HFD (Helmet Flight Display)), to display the pitch and bank angles by reference to a moving horizon by a moving plane avatar, in order to provide them with an objective enhanced movement vision of their aircraft. In such a display mode, when the aircraft starts banking, the plane avatar moves on the banking side, at the same time the horizon moves on the other side, to increase the banking movement perception. After a short time, the horizon slowly comes back to a fixed position parallel to the aircraft wings, and the plane avatar is shown in the final banking position as described above. This type of display could be chosen for example for fighter pilots for a better perception of movements and a final objective sight.

Accordingly, in certain embodiments there may be provided a mode selector adapted to determine which display layout is most suitable to the present conditions, and cause the vehicle orientation display controller to output a display as described with reference to any of the forgoing embodiments in case where the present conditions correspond to a first predetermine set of conditions, and to cause the vehicle orientation display controller to output an alternative display configuration in case where the present conditions correspond to a first predetermine set of conditions.

In a still further embodiment, in such a display mode, when the aircraft starts banking, the vehicle orientation display controller may be adapted to cause the display unit, on request, to display the plane avatar moving on the banking side, while moving the horizon on the other side, to increase the banking movement perception. After a short time, the horizon slowly comes back to a fixed position parallel to the aircraft wings, and the plane avatar is shown in the final banking position. This type of display could be chosen by fighter pilots for a better perception of movements and a final objective sight.

Figure 8:
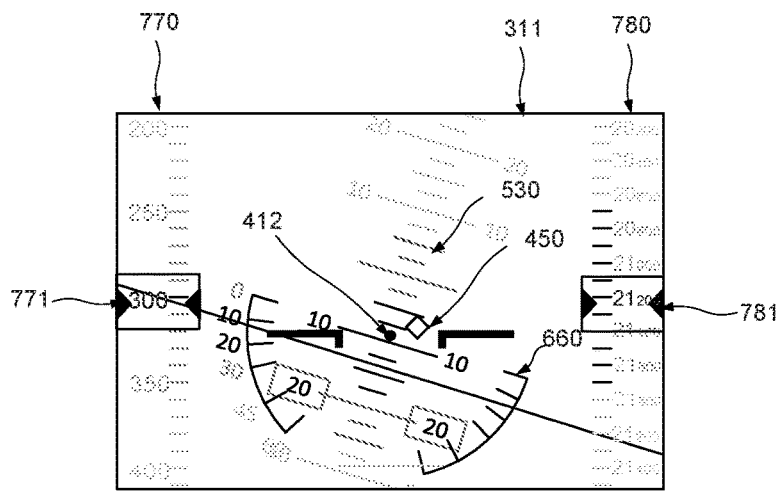
FIG. 8 shows further detail of the display in operation under the control of the display controller in accordance with an embodiment.

FIG. 8 shows further detail of the display in operation under the control of the display controller in accordance with an embodiment.

The features shown on the display of FIG. 8 under the control of the display controller include all those described with respect to FIGS. 4, 5, 6 and 7, however in accordance with the general aims of the present invention, the display of FIG. 7 has been further optimized by selectively highlighting certain parts of the display in comparison to others, so as to emphasize the parts of the display from which key information is to be read by a user such as a pilot.

It will be remarked that by emphasizing these parts, it becomes apparent that in accordance with the different embodiments of the invention the key features tend to be concentrated in a band in the centre of the display, thus reducing the distance to be traveled by a user's gaze in assimilating all of the key information.

Specifically, as shown the display 311 presents more relevant graduations of the pitch scale and of the bank scale are displayed in emphasized form with regard to less relevant respective graduations of the pitch scale or of the bank scale, in this case by showing the pitch values on scale 530 closest to the vehicle avatar in black, and the other values as progressively less dense shades of grey. In particular, graduations of the pitch scale below pitch values of +/−10 to 15° with respect to the instantaneous value in emphasized form with respect to other graduations on the pitch scale.

Similarly the bank values on scales 660 on the side of the higher wing (on the right) are omitted altogether, and on the side of the lower wing, which in the present embodiment is the side used for reading bank values, the bank values on scale 660 closest to the vehicle avatar are filled in black, and the other values as progressively less dense shades of grey. Accordingly the vehicle orientation display controller is adapted to cause the display unit to display graduations of the bank scale on the side the vehicle is banking towards in emphasized form with respect to the side the vehicle is banking away from.

Similarly, as shown the display 311 presents more relevant graduations of the airspeed moving ribbon 770, i.e. those closest to the airspeed index 771 are displayed in emphasized form with regard to less relevant graduations on the airspeed moving ribbon 770, in this case by showing the values on scale 770 closest to the airspeed index in black, and the other values as progressively less dense shades of grey.

Similarly, as shown the display 311 presents more relevant graduations of the altitude moving ribbon 780, i.e. those closest to the altitude index 781 are displayed in emphasized form with regard to less relevant graduations on the altitude moving ribbon 780, in this case by showing the values on scale 780 closest to the altitude index in black, and the other values as progressively less dense shades of grey.

It will be appreciated that while emphasis has been represented by means of shades of grey for the sake of a simple representation on paper, in the context of a real display 311 there are many possible means for emphasizing and de-emphasising parts of the display, and all of these are intended. For example, the vehicle orientation display controller may be adapted to cause the display 311 to display graduations in emphasized form by increasing the luminosity contrast of the graduations, changing the colour of the graduations, blurring less relevant graduations or increasing/decreasing the size of the graduations, simulating a glow, pulsation or blinking effect, and so on. Meanwhile, while emphasizing with respect to other elements may be seen as a positive effect, it may equally be treated as a negative effect, by de-emphasizing less important features, such that the orientation display controller may be adapted to cause the display unit to display the graduations in emphasized form by decreasing the luminosity contrast of the less relevant graduations, changing the colour of the less relevant graduations, blurring the less relevant graduations or reducing the size of the less relevant graduations, or indeed of suppressing the graduations altogether.

Accordingly, the vehicle orientation display controller may be adapted to cause the display unit to display relevant graduations in emphasized form by increasing the luminosity contrast of the graduations, changing the colour of the graduations, blurring less relevant graduations or increasing the size of the graduations.

Furthermore, the vehicle orientation display controller may be adapted to cause the display unit to display the graduations in de-emphasized form by decreasing the intensity of the less relevant graduations, changing the colour of the less relevant graduations, blurring the less relevant graduations or reducing the size of the less relevant graduations.

Still further, the vehicle orientation display controller may be adapted to set the colour of the movable symbol to a normal colour in a case where the flight is below a side-slip threshold, and to set the colour of the movable symbol to a caution colour when the side-slipping value exceeds the side-slip threshold.

It will be appreciated that while the different features of FIG. 8 (airspeed ribbon 770, altitude ribbon 780, pitch scale 530 and bank scale 660) are all shown with the same type of emphasis, such emphasis may be applied selectively to certain features, and the type of emphasis used (intensity, colour, blurring, etc) may vary from feature to feature. Still further, the type of emphasis applied may change over time. Still further, the emphasis of one feature with respect to another may also vary over time for example when it is determined that one particular feature is presenting information of a critical nature, whilst others are of less interest.

It will also be appreciated that the emphasis methods described may be extended to other features not shown in FIG. 8, for example the heading indicator or trend vertical bar incorporating an indication of vertical speed described with reference to FIG. 7, or the moving symbol 450.

In particular, the vehicle orientation display controller may be adapted to set the colour of the movable symbol to a normal colour in a case where the flight is below a side-slip threshold, and to set the colour of the movable symbol to a caution colour when the side-slipping value exceeds the side-slip threshold. The normal colour may be blue, or any other colour as specified for normal operating conditions in the relevant conventional colour scheme applicable to the vehicle in question, and the caution colour may be amber, or any other colour as specified for potentially dangerous operating conditions in the relevant conventional colour scheme applicable to the vehicle in question.

Similarly the graduations on the heading display within 20° of the actual instantaneous heading may be emphasised over other values.

In certain embodiments, the vehicle orientation display controller of may further be adapted to calculate trends in speed and altitude variation, and wherein the vehicle orientation display controller is further adapted to cause the display unit to display a trend vertical bar incorporating an indication of vertical speed.

In certain embodiments, the vehicle orientation display controller may further be adapted to cause the display unit to display an indication of vehicle heading.

In certain embodiments, the vehicle orientation display controller of may further be adapted to cause the display unit to display on the top part of the display unit, clear of any attitude and heading information, additional information in separate apparent or transparent boxes, as the flight envelope protection mode on the left, the aircraft systems global situation in the centre box (by a plane small avatar, whose colour changes from green to orange or red according to the aircraft systems normal, caution or warning status—see claim 13) and the AP (Automatic Pilot) status & selected functions displayed in the right box. The vehicle orientation display controller of claims 1 to 11 adapted to display, on the top part of the display unit, other types of information, such as Total Energy, Angle of Attack or Pilot Stress Level indicators.

In certain embodiments, the vehicle orientation display controller of may further be adapted to cause the display unit to display in the centre box on the top part of the display unit the plane small avatar in green colour when all the aircraft systems are correctly running, in orange colour when a caution alert is triggered and in red when a warning alert is triggered by the aircraft systems surveillance unit. When the aircraft avatar appears in orange or red, a display is open on the MFD (Multi-Function Display) displaying the malfunctioning system page along with the relevant abnormal or emergency check-list, through a software link.

While FIGS. 4 to 8 have introduced a number of features in a cumulative manner, such that each successive embodiment incorporates the features of the preceding embodiments, it will be appreciated that any combination of features may be envisaged. For example, the basic horizon and pitch bank scale of the embodiment of FIG. 4 might be combined with the altitude ribbon of FIG. 7, or the dynamic emphasis features of FIG. 8, without necessarily adding the bank scale of the embodiment of FIG. 6, and so on.

Figure 9:
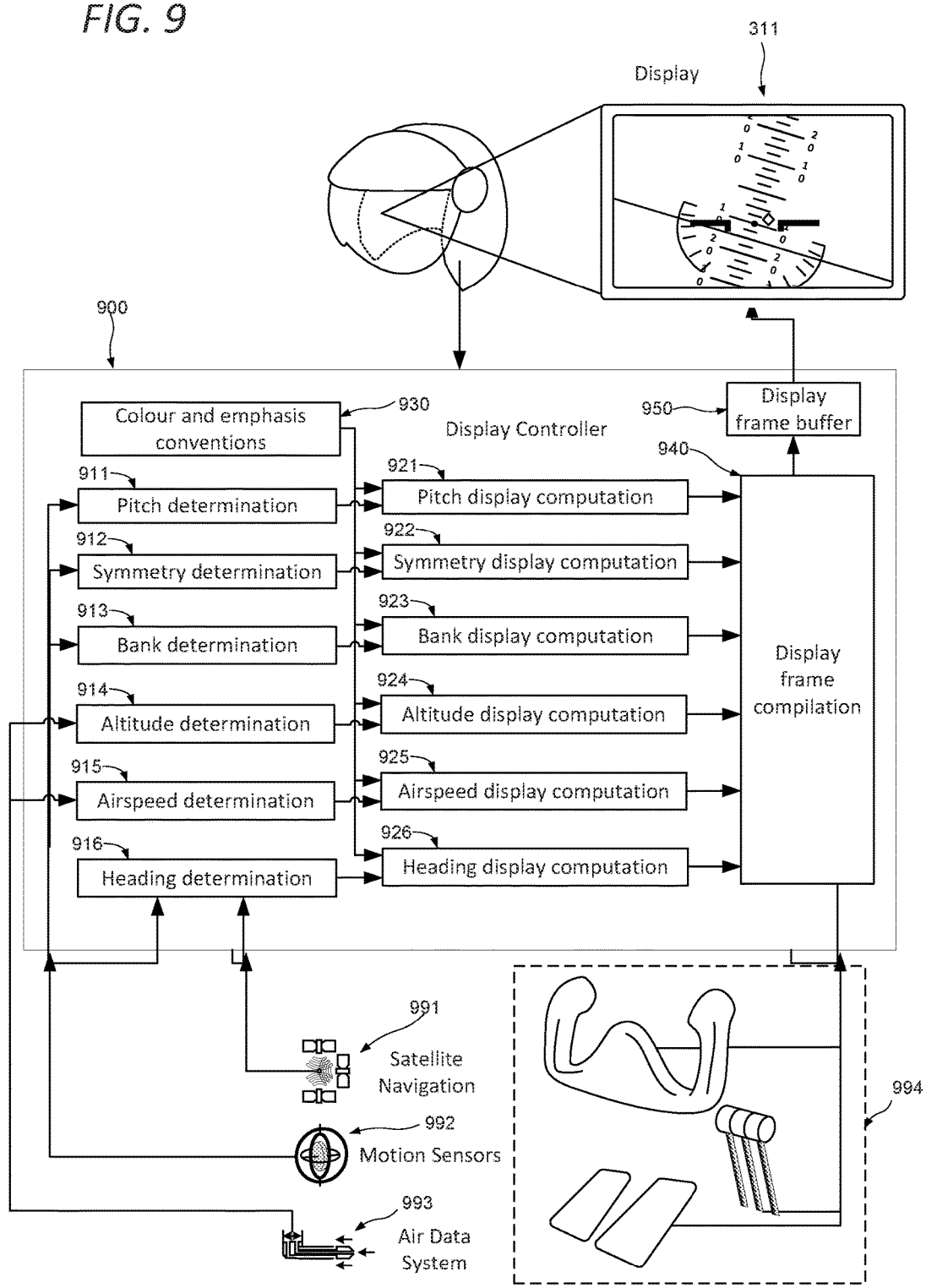
FIG. 9 shows further detail of one variant of the system of FIG. 3.

FIG. 9 shows further detail of one variant of the system of FIG. 3. As shown, there is provided a vehicle attitude display controller 900, in communication with a display 311.

In accordance with this variant, the vehicle attitude display controller 900 is adapted to cause the display 311 to present pitch and bank information of a vehicle associated with the display unit by representation of a vehicle avatar with respect to an artificial horizon and graduated bank and pitch angle scale.

More particularly, in accordance with this variant the vehicle attitude display controller 900 comprises a pitch determination module 911, a symmetry determination module 912, a bank determination module 913, an altitude determination module 914, an airspeed determination module 915 and a heading determination module 916. The vehicle altitude display controller 900 further comprises a colour and emphasis convention memory 930. The vehicle altitude display controller 900 further comprises a pitch display computation module 921 in communication with the pitch determination module 911 and the colour and emphasis convention memory 930, a symmetry display computation module 922 in communication with the symmetry determination module 912 and the colour and emphasis convention memory 930, a bank display computation module 923 in communication with the bank determination module 913 and the colour and emphasis convention memory 930, an altitude display computation module 924 in communication with the altitude determination module 914 and the colour and emphasis convention memory 930, an airspeed display computation module 925 in communication with the airspeed determination module 915 and the colour and emphasis convention memory 930, and a heading display computation module 926 in communication with the heading determination module 916 and the colour and emphasis convention memory 930. The vehicle altitude display controller 900 further comprises a display frame compilation module 940 receiving the outputs of each of the pitch display computation module 921, symmetry display computation module 922, bank display computation module 923, altitude display computation module 924, airspeed display computation module 925 and heading display computation module 926. The vehicle altitude display controller 900 further comprises a display frame buffer 950 receiving the output of the display frame compilation module 940. The frame buffer memory is in communication with the display 311.

The vehicle altitude display controller 900 receives inputs from system sensors such as a satellite navigation system 991, a motion sensor system 992, an air data system 993 and user controls 994. Specifically as shown, the Pitch Determination module 911, Symmetry determination module 912 and Bank determination module 913 receive data from the motion sensors 992, the Altitude determination module 914 and Airspeed determination module 915 receive input from the air data system 993 and satellite navigation system 991 and the heading determination module 916 receives input from the motion sensors 992 and satellite navigation system 991. User controls may comprise any type of user interface feature such as buttons, knobs, joysticks, mouse and the like as discussed in more detail below. In the case of a fixed wing aircraft as shown these may include a control wheel, brake and rudder pedals, Throttle sticks and other sundry controls (not shown).

The satellite navigation system 991 may receive and process signals from one or more satellite navigation systems such as GPS, GLONASS, BeiDOU, Galileo or the like.

The motion sensor system 992 may comprise one or more gyroscopes, accelerometers, and the like.

The air data system 993 may comprise one or more pitot tubes, static pressure or total energy probes, and the like.

Other sensors and input sources may be provided depending on the vehicle type, operating context and display requirements as necessary.

The colour and emphasis memory 930 stores the thresholds and associated colour and emphasis conventions associated with different system states and display values as discussed above for example with reference to FIG. 4, 5, 6, 7 or 8. The memory may be any type of static or dynamic memory, or the value may be hardwired into the system.

In operation, each of the determination modules 911, 912, 913, 914, 915, 916 receives relevant input from the respective instrument systems as described above, and uses this information to derive the values to be output. For example, the Pitch determination module 911 determines the vehicles pitch angle, the Altitude determination module 914 determines the vehicles altitude value, and so on. Each determination module then passes the value on to the corresponding display computation module. Each display computation module determines the proper way to present the corresponding display feature. For example the Pitch display computation module 921 determines the graphical representation of the Pitch scale 530 with regard to the pitch value provided by the pitch determination module 911, and taking into account the rules defined by the colour and emphasis convention memory 930. For example, if a pitch value of 15° is determined, the Pitch display computation module may develop a pitch scale representation showing a central value of 15°, with values from 5° to 25° with a high brightness, and values from −5° to 5° and 25° to 35° with a low brightness, and no other values shown. Each display computation module provides its respective display feature representation to the display frame compilation unit, which processes the features together to define a complete display frame, which is stored in the display frame buffer 950, and presented on the display 311 when the display is next refreshed. The Display frame compilation module 940 also receives input from the user controls 994, enabling features where display features are selectively presented on the basis of user input, for example as in the case of the heading representation discussed with respect to FIG. 7 above.

As shown, the Display 311 may be provided as a Head-Up Display, for example projected inside a pilot's helmet or otherwise on a panel within the cockpit.

Furthermore, as shown, the pilot's helmet may communicate with the Display controller to provide information for example concerning the alignment of the pilot's head, to determine the optimal display format as discussed above.

Figure 10:
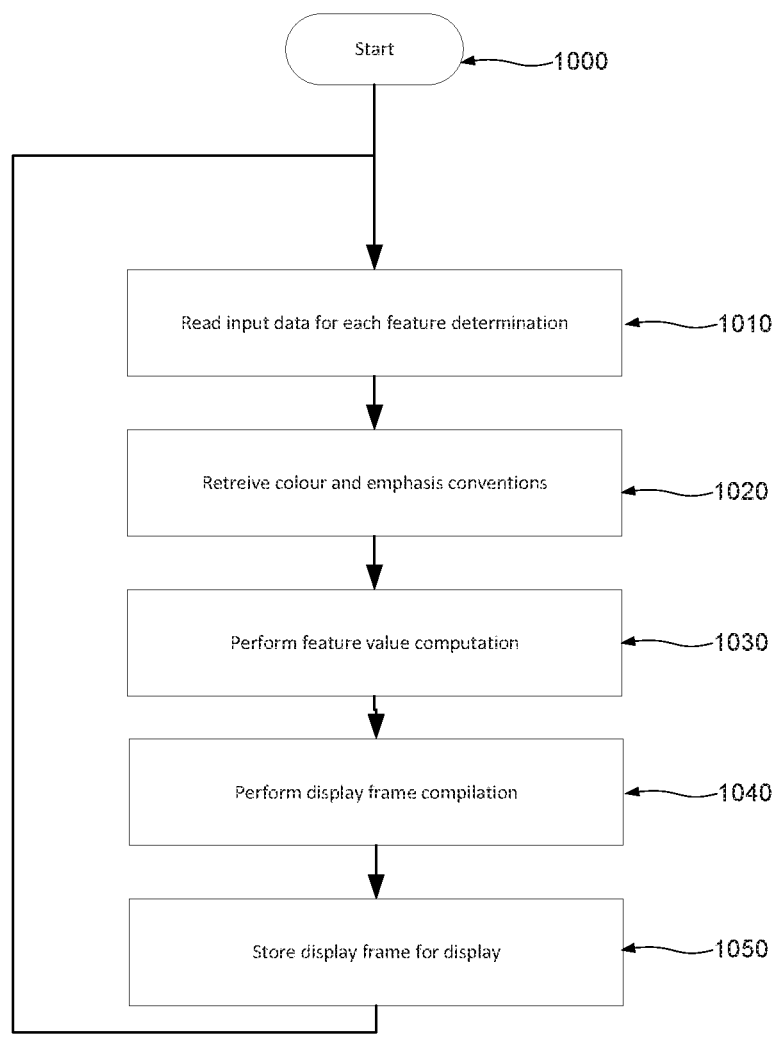
FIG. 10 shows a method in accordance with an embodiment.

FIG. 10 shows a method in accordance with an embodiment.

As shown in FIG. 10, there is provided a method of presenting pitch and bank information of a vehicle on a display associated with the vehicle by representation of a vehicle avatar representing the vehicle with respect to an artificial horizon and graduated bank and pitch angle scale.

As shown, the method starts a step 1000 before proceeding to step 1010 at which input data are read for each feature determination. Features may include pitch scale central value and display range, bank scale central value and display range, symmetry symbol positioning, heading display central value and display range and the like, for example as discussed above. These data may be read for example from satellite navigation systems, motion sensors, air data systems, flight controls or other vehicle systems as applicable, for example as described with reference to FIG. 9.

The method next proceeds to step 1020 at which colour and emphasis conventions are retrieved. As discussed above, these colours and emphasis conventions define the rules by which the raw data are processed into a representation of each feature, in particular what range of adjacent scale values should be retained for display, what type of emphasis should be applied, and the like.

The method next proceeds to step 1030 at which the colours and emphasis conventions are applied to the data read at step 1010 so as to compute a representation of each feature in accordance with the conventions.

The method next proceeds to step 1040 at which the features representations computed at step 1030 are combined to develop a complete representation of all features. This will implement predefined rules concerning how overlapping aspects of different features are handled, with priorities being assigned to certain features, and the overlapping parts of the lower priority feature being de-emphasised or omitted.

The method finally proceeds to steps 1050 at which a complete display frame incorporating the final representation of all features is stored.

The method then loops back to step 1010.

It will be appreciated that the method may optionally wait at step 1010 until the received input data changes. Similarly, steps 1020, 1030 and 1040 need only be performed for features concerned by a changing input data value.

The compilation of the display frame may occur in the display frame memory itself, in which case step 1050 is reached once all necessary updates have been made to the display frame.

In accordance with certain embodiments, there is thus provided a vehicle attitude display such as a Primary Flight Display presents pitch and bank information by displaying a vehicle avatar as fixed, with respect to a moving artificial horizon whilst displaying a movable symbol at a position along the vehicle avatar that is proportional to the symmetry of the vehicle. Parts of the display are dynamically emphasised or de-emphasised to support rapid assimilation of key data. The display format may be dynamically adjusted depending on vehicle use conditions. The display is intended for use both in-vehicle and remotely.

The components of hardware embodiments such as described with respect to FIG. 9 may be implemented by any combination of circuits comprising discrete or integrated components, as well as programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), or computing devices suitable programmed to implement some or all features, or any combination of these. It will be appreciated that the blocks of FIG. 9 need not map directly to discrete physical units, and that their functions may be distributed across a number of such units.

Certain implementations may take the form of software embodiments. Software embodiments include but are not limited to applications, firmware, resident software, microcode, etc. The invention can take the form of a computer program product accessible from a computer-usable or computer-readable medium providing program code for use by or in connection with a computer or an instruction execution system.

A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, an application-programming interface (API), a library, and/or other computer-program product, or any combination of such entities.

The user device may be a mobile device such as a smart phone or tablet, a drone, a computer or any other device with processing capability, such as a robot or other connected device, including IoT (Internet Of Things) devices.

Figure 11:
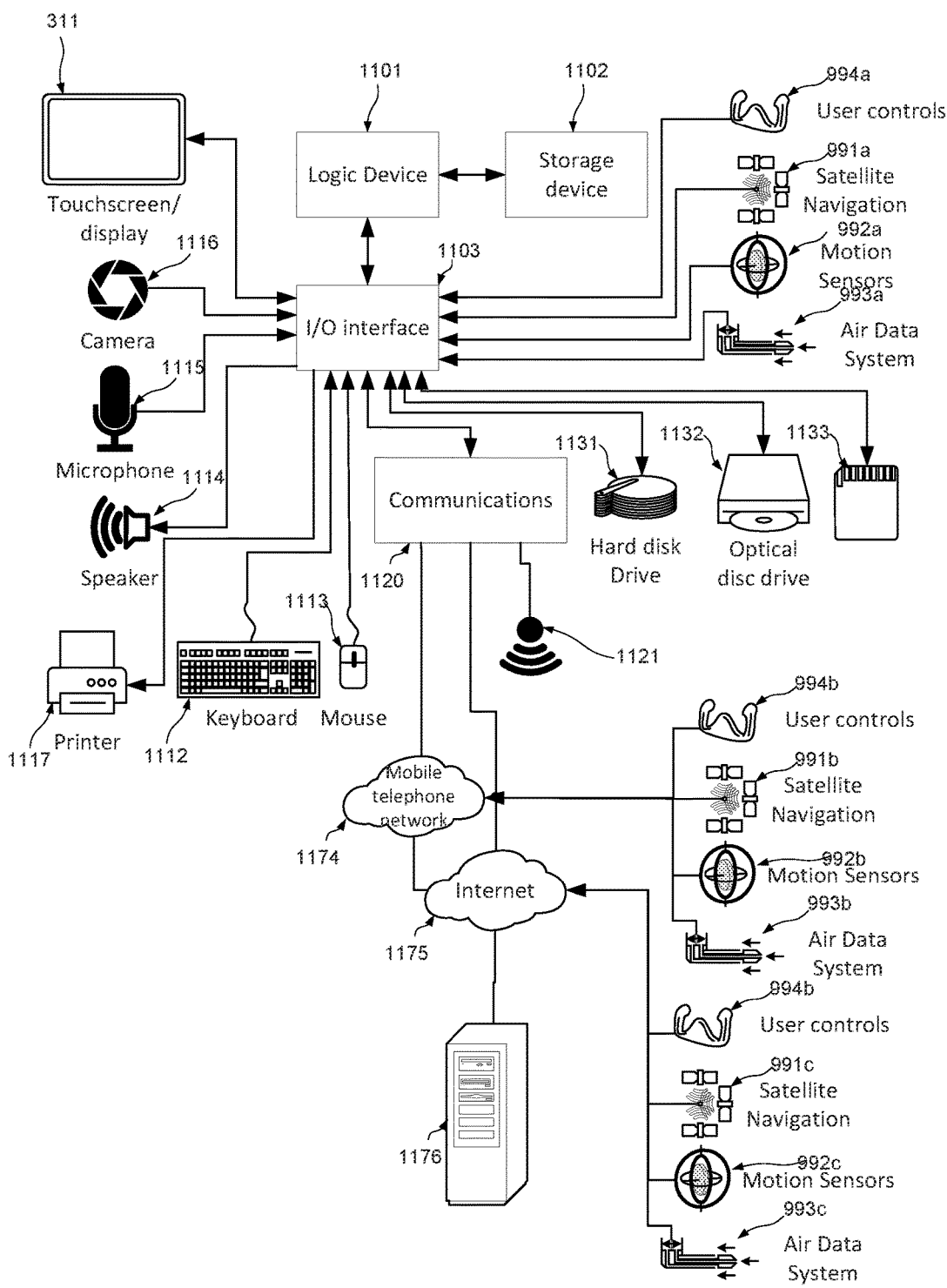
FIG. 11 shows a generic computing system suitable for implementation of embodiments of the invention.

FIG. 11 shows a generic computing system suitable for implementation of embodiments of the invention.

A shown in FIG. 11, a system includes a logic device 1101 and a storage device 1102. The system may optionally include a display subsystem 311, input/output subsystem 1103, communication subsystem 1120, and/or other components not shown.

Logic device 1101 includes one or more physical devices configured to execute instructions. For example, the logic device 1101 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 1101 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 1101 optionally may be distributed among two or more separate devices, which may be remotely located and/or configured for coordinated processing. Aspects of the logic device 1101 may be virtualized and executed by remotely accessible, networked computing devices configured in a cloud-computing configuration.

Storage device 1102 includes one or more physical devices configured to hold instructions executable by the logic device to implement the methods and processes described herein. When such methods and processes are implemented, the state of storage 1102 device may be transformed—e.g., to hold different data.

Storage device 1102 may include removable and/or built-in devices. Storage device may be locally or remotely stored (in a cloud for instance). Storage device 1102 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 1103 adapted to support communications between the Logic device 1101 and further system components. For example, additional system components may comprise removable and/or built-in extended storage devices. Extended storage devices may comprise one or more types of storage device including optical memory 1132 (e.g., CD, DVD, HD-DVD, Blu-Ray Disc, etc.), semiconductor memory (not shown) (e.g., RAM, EPROM, EEPROM, FLASH etc.), and/or magnetic memory 1131 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 1101 and storage device 1102 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device 1102. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 11 may be used to implement embodiments of the invention.

For example a program implementing the steps described with respect to FIG. 10, may be stored in storage device 1102 and executed by logic device 1101.

Accordingly the invention may be embodied in the form of a computer program.

It will be appreciated that a "service", as used herein, is an application program executable across multiple user sessions. A service may be available to one or more system components, programs, and/or other services. In some implementations, a service may run on one or more server-computing devices.

When included, display subsystem 311 may be used to present to present pitch and bank information of a vehicle associated with the display by representation of a vehicle avatar representing the vehicle with respect to an artificial horizon and graduated bank and pitch angle scale as discussed above. The display frame may be stored in the storage device 1102, in dedicated display memory elsewhere or other storage as discussed below.

This visual representation may take the form of a graphical user interface (GUI). As the herein described methods and processes change the data held by the storage device 1102, and thus transform the state of the storage device 1102, the state of display subsystem 311 may likewise be transformed to visually represent changes in the underlying data. Display subsystem 311 may include one or more display devices utilizing virtually any type of technology for example as discussed above. Such display devices may be combined with logic device and/or storage device in a shared enclosure, or such display devices may be peripheral display devices.

When included, input subsystem may comprise or interface with one or more user-input devices such as a keyboard 1112, mouse 1113, touch screen 311, or game controller (not shown).

The input subsystem may additionally comprise or interface with one or more input devices such as user controls 994a, satellite navigation system 991a, motion sensors 992a or air data systems 993a.

In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone 1115 for speech and/or voice recognition; an infrared, colour, stereoscopic, and/or depth camera 1116 for machine vision and/or gesture recognition; a head tracker, eye tracker, accelerometer, and/or gyroscope for motion detection and/or intent recognition; as well as electric-field sensing componentry for assessing brain activity.

When included, communication subsystem 1120 may be configured to communicatively couple computing system with one or more other computing devices. For example, communication module of communicatively couple computing device to remote service hosted for example on a remote server 1176 via a network of any size including for example a personal area network, local area network, wide area network, or internet. The communication subsystem may include wired and/or wireless communication devices compatible with one or more different communication protocols.

The communication subsystem may additionally comprise or interface with one or more input devices such as user controls 994b, satellite navigation system 991b, motion sensors 992b or air data systems 993b.

As non-limiting examples, the communication subsystem may be configured for communication via a wireless telephone network 1174, or a wired or wireless local- or wide-area network. In some embodiments, the communication subsystem may allow computing system to send and/or receive messages to and/or from other devices via a network such as Internet 1175. The communications subsystem may additionally support short range inductive communications with passive or active devices (NFC, RFID, UHF, etc).

As shown, the communication subsystem may communicate via wireless telephone network 1174 with one or more input devices such as user controls 994c, satellite navigation system 991c, motion sensors 992c or air data systems 993c.

It will be noted that three different instances of communications with input devices such as user controls, satellite navigation system, motion sensors or air data systems are represented, corresponding to alternative usage scenarios. In the first case, where these input devices are in communication directly with the input interface 1103, it may be that the system is installed in the vehicle itself, and the representations displayed on display 311 are displayed to a pilot in the vehicle. Alternatively or additionally, one or more further displays (not shown) may be sent the same representation via the communications interface 1120. In the second and third cases, where these input devices are in communication via the communications interface with the input interface 1103, it may be that the system is installed remotely to the vehicle itself, and the representations displayed on display 311 are displayed to a pilot or other person with a monitoring role at the remote location. Alternatively or additionally, one or more further displays (not shown), for example one on the vehicle may be sent the same representation via the communications interface 1120.

Figure 12:
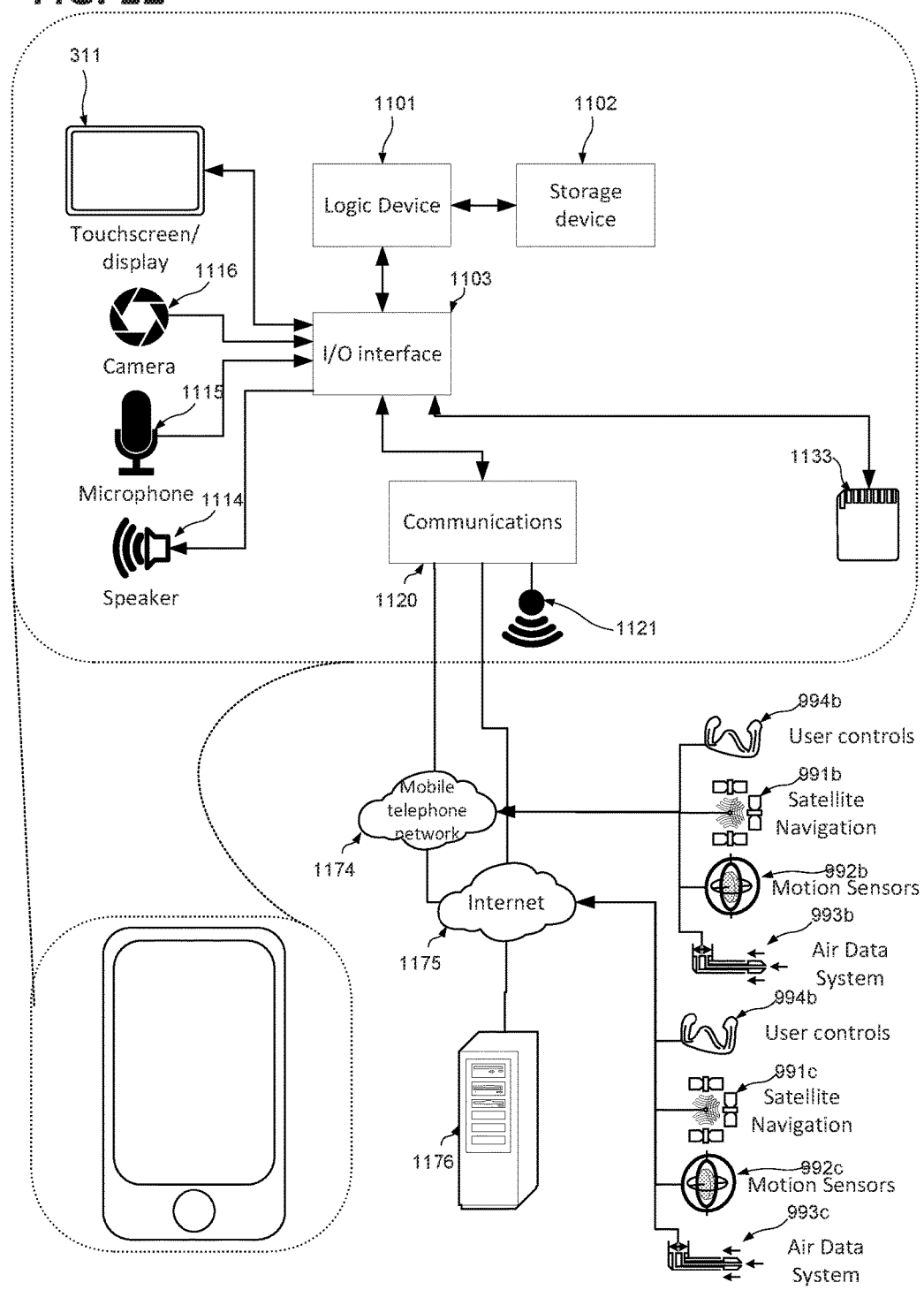
FIG. 12 shows a smartphone device adaptable to constitute an embodiment.
Figure 13:
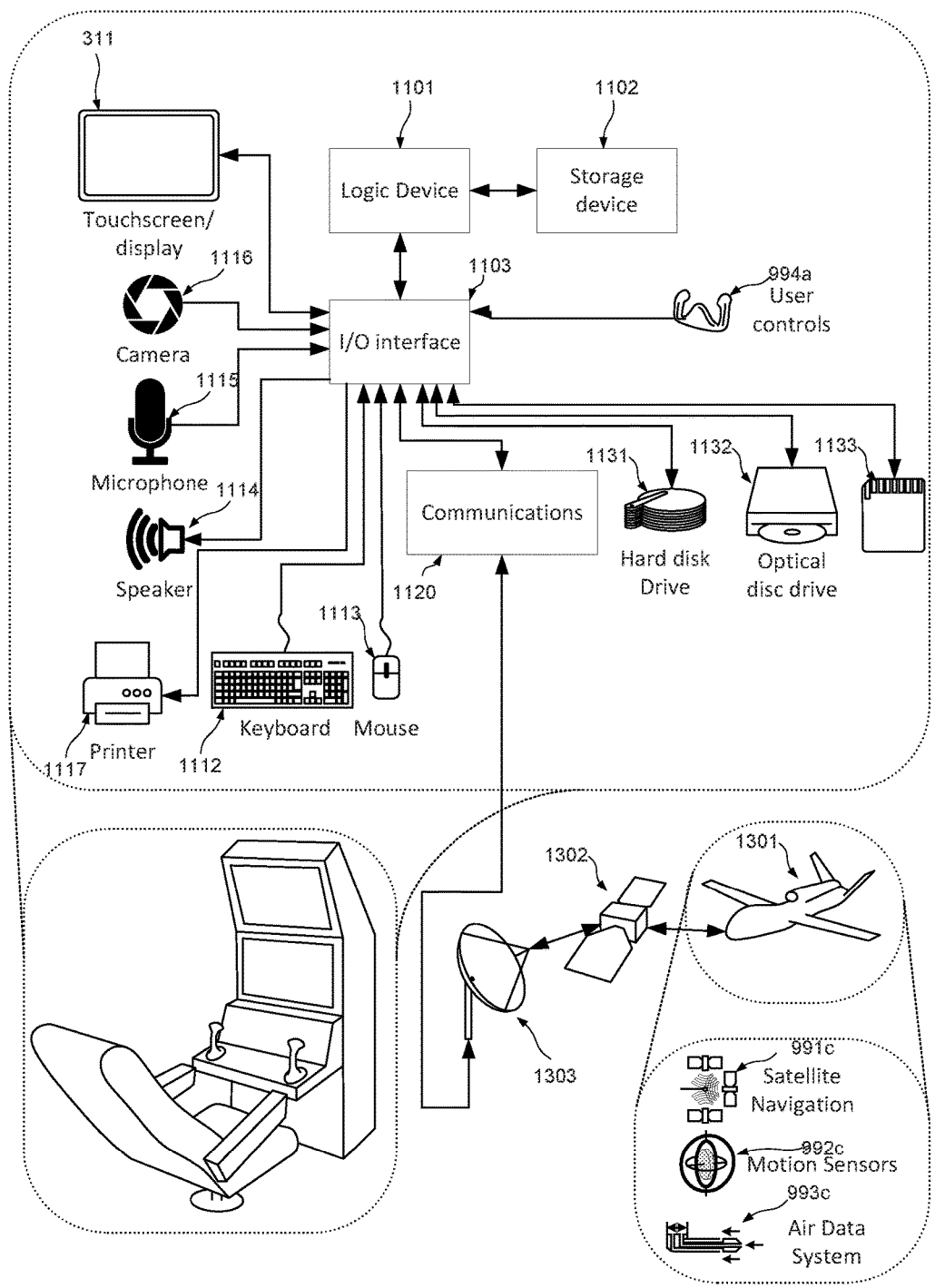
FIG. 13 shows a drone cockpit adaptable to constitute an embodiment.

The system of FIG. 11 is intended to reflect a broad range of different types of information handling system. It will be appreciated that many of the subsystems and features described with respect to FIG. 11 are not required for implementation of the invention, but are included to reflect possible systems in accordance with the present invention. It will be appreciated that system architectures vary widely, and the relationship between the different sub-systems of FIG. 11 is merely schematic, and is likely to vary in terms of layout and the distribution of roles in systems. It will be appreciated that, in practice, systems are likely to incorporate different subsets of the various features and subsystems described with respect to FIG. 11. FIGS. 12 and 13 disclose further example devices in accordance with the present invention. Those of ordinary skill in the art will appreciate that systems may be employed in the future which also operate in accordance with the present invention.

FIG. 12 shows a smartphone device adaptable to constitute an embodiment. As shown in FIG. 6, the smartphone device incorporates elements 1101, 1102, 1103, 1120, optional near field communications interface 1121, flash memory 1133 and elements 1114, 1115, 1116 and 311 as described above. It is in communication with the telephone network 1174 and a server 1176 via the network 1175. Alternative communication mechanisms such as a dedicated network or Wi-Fi may also be used. The features disclosed in this figure may also be included within a tablet device as well. As shown, the communication subsystem 1120 is in communication with via wireless telephone network 1174 with input devices such as user controls 994b, satellite navigation system 991b, motion sensors 992b and air data systems 993b and via the internet with user controls 994c, satellite navigation system 991c, motion sensors 992c or air data systems 993c. The smart phone device may only be in communication with one or other of these groups of input devices.

An implementation of the present invention in a smartphone device may occur in the case of a consumer drone or other such remotely controlled vehicle, in which case the smart phone device may also be the source of control signals to the vehicle (and the user controls 994b and 994c may be omitted. Alternatively, a smart phone device may be used solely for monitoring a vehicle.

FIG. 13 shows a drone cockpit adaptable to constitute an embodiment. As shown in FIG. 13, the drone cockpit comprises elements 1101, 1102, 1103, 1120, 1114, 1115, 1116, 311, 1131, 1132, 1133, 994a as described above. As shown it is in communication with a drone 1301, and in particular motion sensors 992c and air data systems 993c and satellite navigation system 991c via a communications satellite 1302 and a radio antenna 1303 coupled to the communications interface 1120. Alternative communication mechanisms may also be used.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A vehicle attitude display controller adapted to cause a display to present pitch and bank information of a vehicle associated with said display by representation of a vehicle avatar representing said vehicle with respect to an artificial horizon and graduated bank and pitch angle scale, characterized in that said display controller is adapted to cause said vehicle avatar to be displayed in fixed relation to said display and to display said artificial horizon at an angle with respect to said vehicle avatar corresponding to the real instantaneous bank angle of said vehicle and wherein said vehicle attitude display controller is further adapted to cause said display unit to display a movable symbol in the form of a lozenge in a horizontal position with respect to the extremities of the vehicle avatar that is proportional to the symmetry of the vehicle, wherein said vehicle attitude display controller is adapted to cause said display to represent said avatar as comprising lateral lines separated by an index point, and to cause the display to represent said movable symbol as moving along said lateral lines.

2. A vehicle attitude display controller according to claim 1 wherein said vehicle attitude display controller is adapted to cause said display to present pitch information with a movable linear scale aligned perpendicularly to the artificial horizon and passing through said vehicle avatar, such that an index point of said vehicle avatar designates an angle value on said scale reflecting the real instantaneous pitch attitude of said vehicle.

3. A vehicle attitude display controller according to claim 1 wherein said vehicle attitude display controller is adapted to cause said display to represent said movable symbol is moved parallel to the pitch rotation axis of said vehicle.

4. The vehicle attitude display controller of claim 1 further adapted to cause said display unit to display a movable polar scale having its pole at said index point, whereby the bank attitude of said vehicle can be read from said polar scale with reference to a planar feature of said vehicle avatar.

5. The vehicle attitude display controller of claim 4 wherein said vehicle attitude display controller is adapted to cause said display unit to display a planar feature representing the wingtip of the lower wing of said vehicle.

6. The vehicle attitude display controller of claim 5 wherein said vehicle attitude display controller is adapted to cause said display unit to display said graduated scale outside the radius described by said planar feature as said vehicle changes bank.

7. The vehicle attitude display controller of claim 5 wherein said vehicle attitude display controller is adapted to cause said display unit to display more relevant graduations of the pitch scale or of the bank scale in emphasized form with regard to less relevant respective graduations of the pitch scale or of the bank scale.

8. The vehicle orientation display controller of claim 7 wherein said vehicle orientation display controller is adapted to cause said display unit to display graduations of the pitch scale below pitch values of +/−10 to 15° with respect to the instantaneous value in emphasized form with respect to other graduations on the pitch scale.

9. The vehicle orientation display controller of claim 7 wherein said vehicle orientation display controller is adapted to cause said display unit to display graduations of the bank scale on the side the vehicle is banking towards in emphasized form with respect to the side the vehicle is banking away from.

10. The vehicle orientation display controller of claim 1 further comprising a mode selector adapted to cause said vehicle orientation display controller to output a display in accordance with any preceding claim in case where present conditions correspond to a first predetermined set of conditions, and to cause said vehicle orientation display controller to output an alternative display configuration in case where said present conditions correspond to a second predetermined set of conditions.

\* \* \* \* \*